United States Patent
Engel et al.

(10) Patent No.: US 7,634,383 B2
(45) Date of Patent: Dec. 15, 2009

(54) PROGNOSIS ADAPTATION METHOD

(75) Inventors: Stephen J. Engel, East Northport, NY (US); David H. Hoitsma, Brentwood, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/888,221

(22) Filed: Jul. 31, 2007

(65) Prior Publication Data

US 2009/0037122 A1 Feb. 5, 2009

(51) Int. Cl.
*G06F 19/00* (2006.01)
(52) U.S. Cl. .................................. 702/181; 73/799
(58) Field of Classification Search ............ 702/34–35, 702/81–84, 179, 181, 189; 73/804, 799, 73/760
See application file for complete search history.

(56) References Cited

U.S. PATENT DOCUMENTS 6,532,421 B2 * 3/2003 Miwa ......................... 702/34
6,928,391 B2 * 8/2005 Fujiyama et al. ............ 702/185

OTHER PUBLICATIONS

Kato et al., "Signature Verification using a Monte Carlo-based Updating Algorithm Adapted to Intersession Variability", Dec. 12-15, 2006, Intelligent Signal Processing and Communications, 2006. ISPACS '06. International Symposium on, pp. 387-390.*

Bengio, "Continuous Optimization of Hyper-parameters", 2000, Neural Networks, 2000. IJCNN 2000, Proceedings of the IEEE-INNS-ENNS International Joint Conference on, vol. 1, pp. 305-310.*
Bayes' theorem, Wikipedia, the free encyclopedia, http://en.wikipedia.org/wiki/Bayes'_theorem, Dec. 18, 2006, 9 pages, Wikimedia Foundation, Inc.
Monte Carlo method, Wikipedia, the free encyclopedia, http://en.wikipedia.org/wiki/Monte_Carlo_Simulation, Nov. 9, 2006, 6 pages, Wikimedia Foundation, Inc.
Empirical Bayes method, Wikipedia, the free encyclopedia, http://en.wikipedia.org/wiki/Empirical_Bayes_method, Nov. 9, 2006, 5 pages, Wikimedia Foundation, Inc.

* cited by examiner

*Primary Examiner*—Eliseo Ramos Feliciano
*Assistant Examiner*—Mary C Baran
(74) *Attorney, Agent, or Firm*—Stetina Brunda Garred & Brucker

(57) ABSTRACT

There is provided a method for generating a probability distribution for a desired variable. A hyper parameter density function is provided, from which values are randomly selected. The selected hyper parameter value is used to compute an input variable value. A value is randomly selected from each input variable probability density function. These values are input into a physics model to compute an output value. This process is repeated to generate numerous output values, which are then used to construct an output value probability density function. After the output value probability density function is constructed, output value sensor data is obtained. The output density function is updated using the sensor data and a probabilistic evaluation of the hyper parameters. Improved predictions are iteratively made with the updated output distribution.

17 Claims, 5 Drawing Sheets

PROGNOSIS ADAPTATION METHOD

STATEMENT RE: FEDERALLY SPONSORED RESEARCH/DEVELOPMENT

Funded in part under Defense Advanced Research Projects Agency under Contract No. HR0011-04-C-0003.

CROSS-REFERENCE TO RELATED APPLICATIONS

Not Applicable.

BACKGROUND

This invention relates in general to a probability assessment method. Specifically, the invention relates to a method for generating and updating a probability distribution for a desired variable.

It is commonly known that as equipment is used, it sustains wear and tear. If the wear and tear is not monitored, the equipment may fail. This can be particularly catastrophic in the case of vehicles, airplanes, bridges, buildings, etc. Therefore, it is extremely important to closely monitor the structural integrity of such equipment.

Current military approaches to supervision of the structural integrity of their vehicles have successfully avoided catastrophic structural failure. However, this safety has been achieved at the expense of operation readiness and added costs.

Uncertainty about the actual state of structural degradation, and enforced, conservative maintenance schedules result in non-optimum vehicle availability. For instance, within a given aircraft fleet, several aircraft may be grounded, while others may be restricted to limited flight profiles because they have reached or surpassed 100% of their calculated life. A common approach employed by the U.S. Navy called "safe-life," uses a cumulative damage index known as Fatigue Life Expended (FLE). When FLE reaches 100%, the probability of having an initiated crack of 0.01" or greater is approximately 0.001. Thus, given 1000 aircraft all having their FLE=100%, only one of them is likely to have a crack of 0.01" or greater. At 100% FLE, some aircraft have actually accumulated only 50% of the damage required to form a 250 µm (0.01-in.) crack at their "hot spot." The "hot spot" is the most fatigue critical location in the airframe. The location of the hot spot and the service life required for crack formation are determined by a full-scale fatigue test. In many cases, the full-scale fatigue test was performed many years ago. A safety factor of two is generally used because of the combined uncertainties in many factors, including: the microstructurally-based stochastic nature of the damage accumulation process; differences between the original test spectrum and the actual flight spectra; uncertainties in the predictive technology; errors in the fatigue tracking algorithms; etc. If the entire fleet were grounded at 100% FLE, a significant portion of the total potential life to the fleet would have been lost. This is a severe financial burden, and also imposes significant limitations on the use of existing aircraft. Therefore, a more accurate failure prediction method would allow for more efficient aircraft usage.

Most of the current failure prediction methods are deterministic (i.e. failure will happen at 2:00 o'clock). Deterministic predictions typically identify the median. In other words, half of the time, the failure has already occurred. As a given prediction becomes more precise, the probability that the given prediction will become true decreases.

The governing parameters for most failure prediction methods are static, meaning that the parameters are generally determined analytically through experimentation. Current methods that dynamically adjust predictions only adjust the current state. The underlying parameters are not adjusted. No existing methods iteratively integrate all available information while accounting for all the associated uncertainty.

As such, there exists a need in the art for providing a prompt, informed prediction method regarding the structural viability of individual aircraft based on tracking their actual use and modeling of anticipated usage.

BRIEF SUMMARY

According to an aspect of the present invention, there is provided a method for generating a probability distribution for a desired output variable. The output variable is a function of at least one input variable. The input variable is defined by an input variable probability density function that is characterized by at least one hyper parameter. Each hyper parameter is defined by a hyper parameter probability density function.

A hyper parameter density function is given. Values are randomly sampled from the hyper parameter density function. The sampled values are used to define the hyper parameters values of one or more input variable probability density functions. Then, a value is randomly selected from each input variable probability density function. Subsequently each value is input into a model to compute an output value. This process is repeated to generate numerous output values, which are then used to construct an output value probability density function. After the output value probability density function is constructed, output value sensor data is obtained. The hyper parameter density function is updated using the sensor data and a probabilistic evaluation of the hyper parameter. Consequently, the output density is also changed because the hyper parameter distribution has been updated.

The method may further include the steps of assigning a weight to each hyper parameter according to agreement between the sensor data and output. A final output probability density function may be generated by normalizing the sum of the probability densities from each of the weighted probability density functions. The final output probability density function may be used to generate an output prediction. A confidence interval may be computed based on a preferred confidence level.

The present invention converts deterministic predictions into probabilistic predictions (i.e. probability of failure at 2:00 o'clock is 0.99). Model uncertainty is combined with sensor uncertainty to produce the best estimate of current state. The present invention also updates model parameters and random variable characterizations to improve the next prediction step.

It is contemplated that the present invention may be particularly useful when used to predict a crack length within a material. The prediction may predict the crack length as a function of time, or as a function of material usage. The crack length prediction method includes the step of providing crack length input data. The crack length input data is input into a model to generate a prediction as to the crack length as a function of usage. Crack sensor data is obtained and used to update the prediction. The updated prediction accounts for the probability of detection and a probability of false alarm for the sensor.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
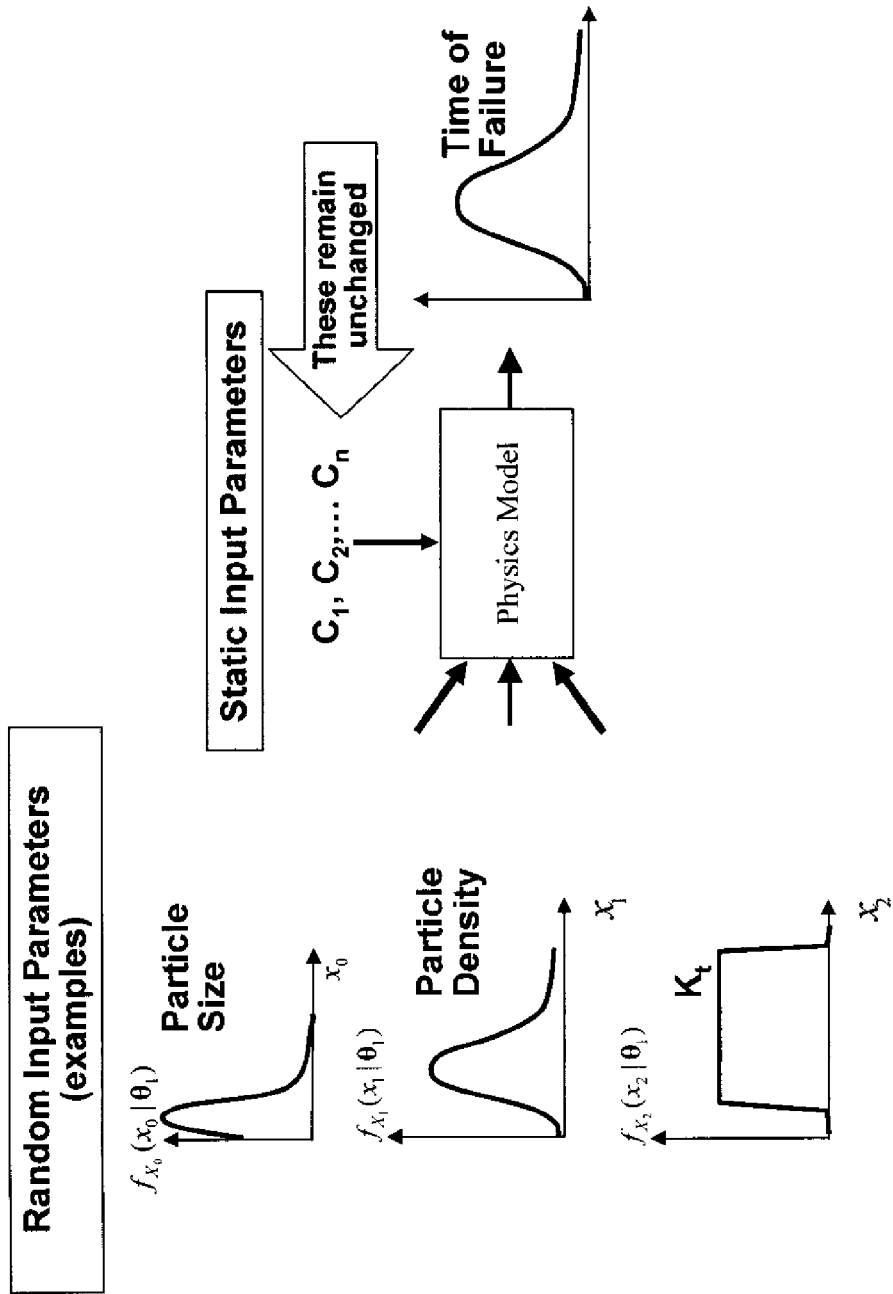
FIG. 1 is a graphical representation of an embodiment of the present invention.

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Although the present invention may be employed in a wide variety of statistical analysis applications, it is contemplated that the present invention may find widespread applicability in structural integrity and viability applications. As such, the following description focuses on aspects and embodiments of the present invention in the context of structural integrity and viability.

According to an aspect of the present invention, there is provided a method of predicting the state of health of a component at a prescribed point in the future. Predictions can be expressed in terms of the health condition at a future point, or a time to reach a specified health condition. The future point can be expressed in terms of time or usage. An embodiment of the present invention aims at providing confident information about a future failure with sufficient advanced notice to take appropriate action.

For structural integrity applications, the appropriate action is often to remove the indicated component prior to its failure, but not so early that its capability is not fully utilized. The key is the fundamental realization that a precise, deterministic prediction of failure is not the ultimate goal. By their very nature, future health predictions are unavoidably probabilistic and thus involve risk. Achieving the perfect balance between failure avoidance and unnecessary maintenance thus requires advanced methodologies that can interpret available data with their uncertainties to form the information necessary to evaluate and manage risks. The present invention provides this transformation from uncertain data to actionable information for structural risk management.

The key parameters associated with risk are the probability of a given failure and the impact of that failure. The latter depends on many factors including the effect of failure on safety, availability and cost. An aspect of the present invention deals primarily with the computation of probability of failure as it continuously evolves during component use. The present invention accomplishes this by coupling sensor data with failure models that embody the physics involved with damage progression while accounting for the uncertainties from all sources.

Fatigue failure models are typically deterministic transformations that use a variety of material parameters, estimates of current state and anticipated usage as input to project future state (i.e. crack initiation and growth) as a function of time and/or usage. Material parameters may include the size, orientation, proximity, etc. of constituent particles, their relationship within the matrix, the grain size, orientation, surface condition and many other factors previously mentioned. While not known explicitly for any given aircraft component, the uncertainty in each of these parameters can be characterized statistically. Even if each parameter can be known without error, the models themselves can introduce error due to an inexact representation of the physics involved.

Deterministic systems that use uncertain inputs produce uncertain outputs. The challenge for reasoning and prediction is to accurately represent the uncertainty in the output prediction as a function of the combined uncertainty in the inputs and models. Further, in cases where current state can be iteratively assessed, the methods of the present invention can be used to 'personalize' predictions per aircraft and adaptively update predictions by recognizing the most probable failure model.

An embodiment of the present invention provides prompt, informed predictions of the structural viability of individual aircraft based on tracking of their actual use and modeling of anticipated usage. The system is capable of sensing the state of critical components of individual vehicles and uses intimate knowledge of their microstructure and failure mechanisms for prediction of near-term operability.

Figure 2:
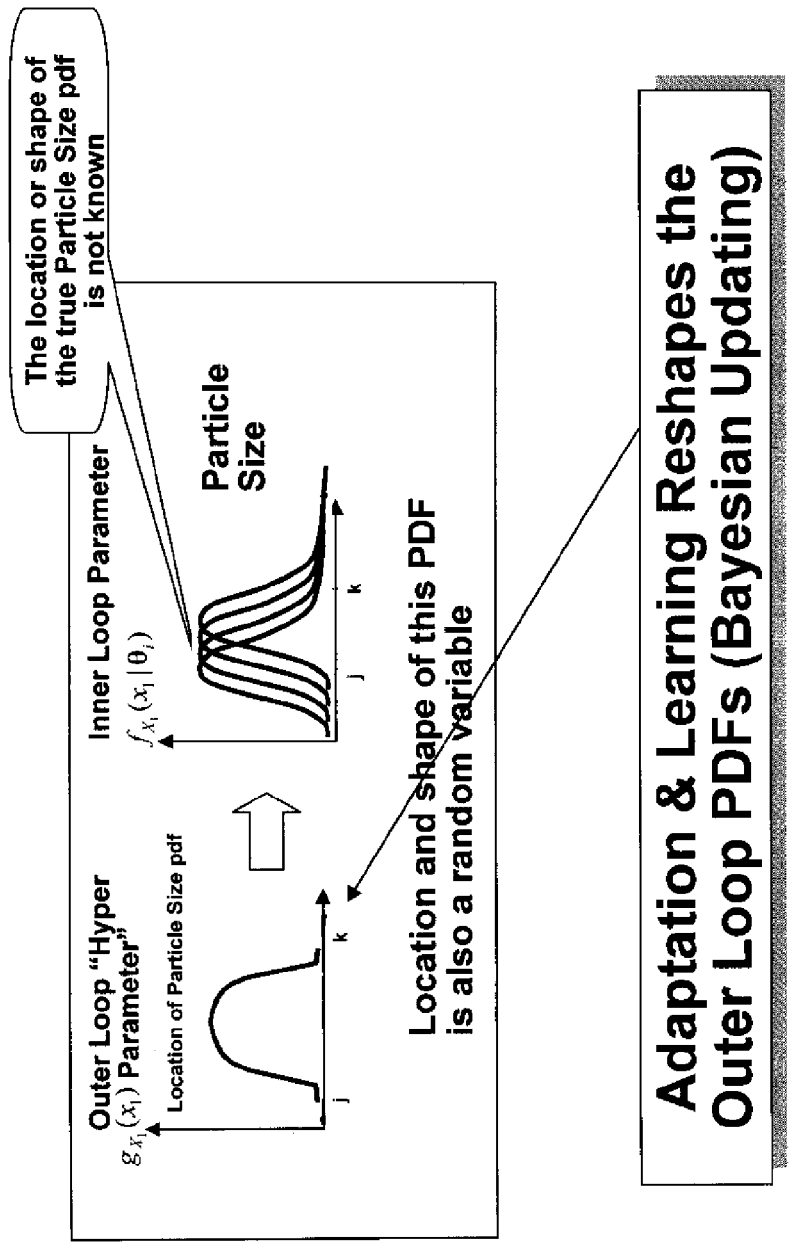
FIG. 2 is a graphical representation of an embodiment of the hyper parameter density function.

In many cases, failure is caused by a crack that develops within a material. The length of the crack depends on a number of material parameters as described above, and as can be seen in FIG. 1. Such material parameters are inputs to a model which produces a predicted crack length. The material parameters are referred to herein as input variables. Each input variable may be represented by a probability density function, referred to as the input variable probability density function. As used herein, a probability density function is a function of a continuous variable whose integral over a region gives the probability that a random variable falls within the region. The size and shape of each input variable probability density function is defined by hyper parameters. The hyper parameters are themselves random variables that are represented by a probability density function, referred to as the hyper parameter density function, as can be seen in FIG. 2.

Figure 5:
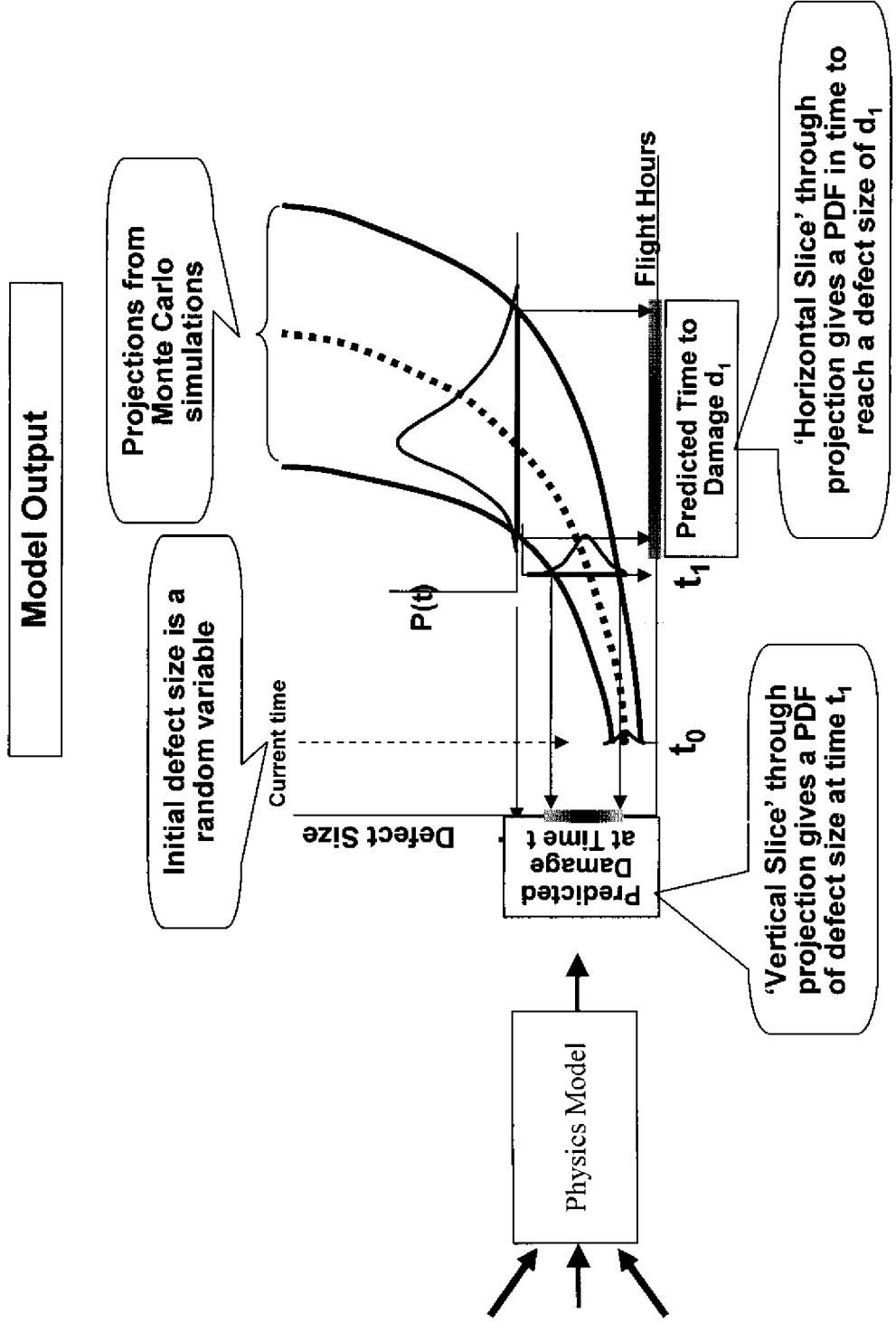
FIG. 5 is a graphical representation of an embodiment of a physics model output.

A hyper parameter density function is provided, from which values are randomly selected. The selected hyper parameter values are used to construct each input variable probability density function. Then a value is randomly selected from each input variable probability density function. The values are input into a model to compute an output value. FIG. 5 illustrates an embodiment of the invention wherein the physics model is used to generate a predicted output. This process is repeated to generate numerous output values, which are then used to construct an output value probability density function. After the output value probability density function is constructed, output value sensor data is obtained.

Sensors actively or passively 'interrogate' structure to provide information about the current state of material health from the incipient indications of defect incubation to crack size estimates. Sensor data includes uncertainties expressed as detection/false alarm probabilities as well as measurement errors. Sensor data may be broken down into two stages. Stage one applies to the earliest indications where sensor data are most uncertain. The first stage is mechanized by predicting when a defect will be of detectable size by one or more state-awareness sensors. At this point, the sensor is used simply to detect the presence or absence of a defect rather than to quantify its extent. In stage two, the size of the defect, as determined by sensor data and the associated measurement error, is used to assess the likelihood of various model predictions.

Figure 3:
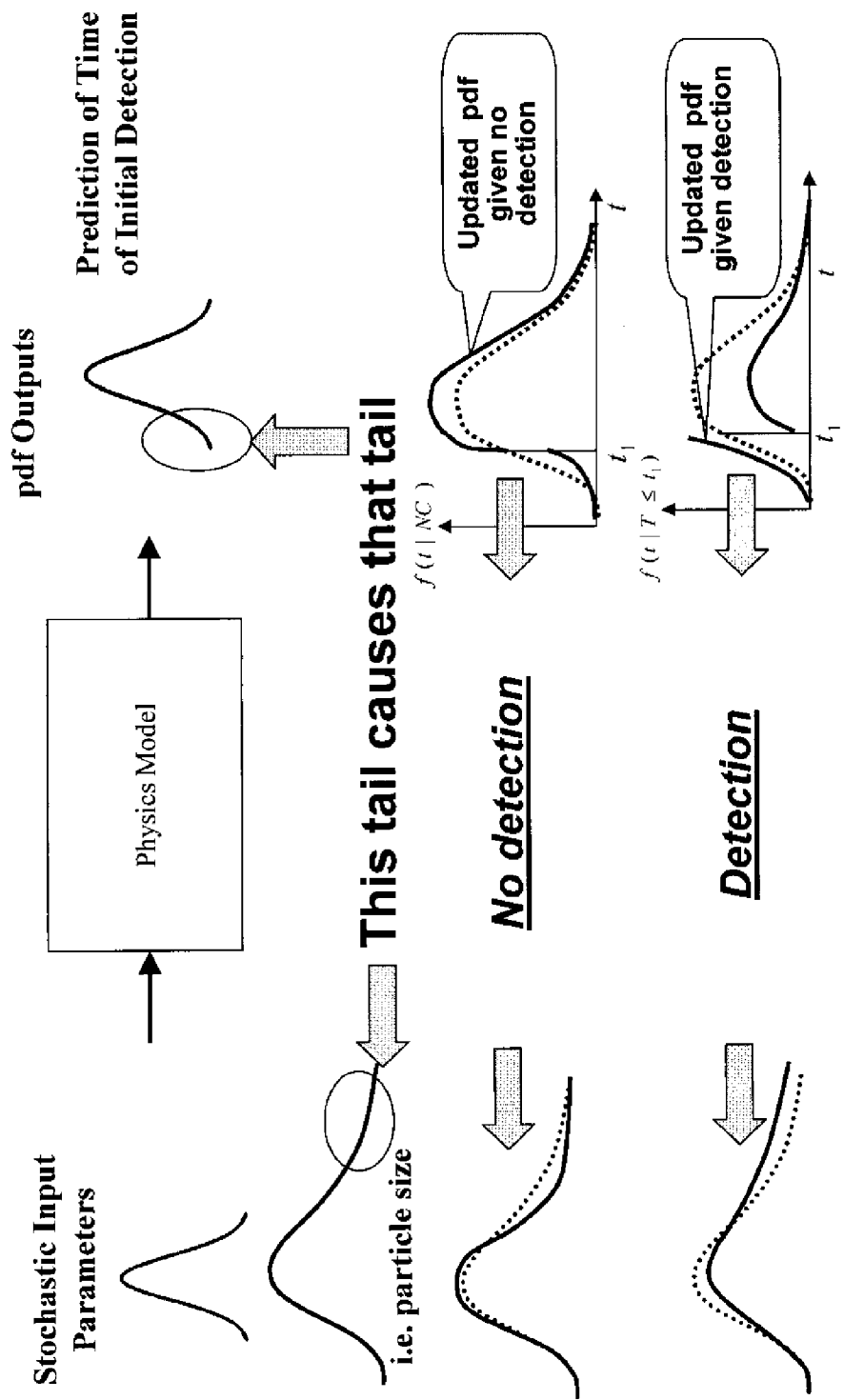
FIG. 3 is a graphical representation illustrating a relationship between an output probability density function and an input probability density function.
Figure 4:
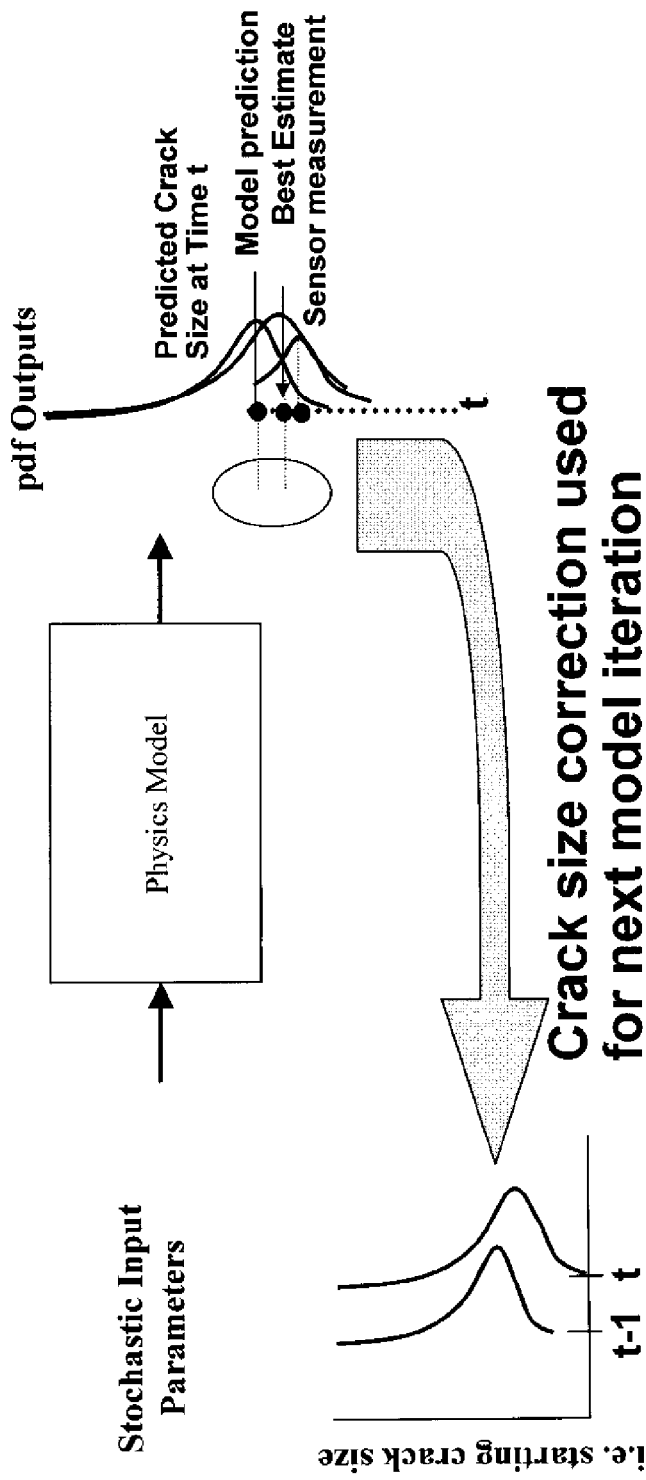
FIG. 4 is a graphical representation of updating the output probability density function.

After the sensor data is obtained, the hyper parameter density function is updated by making a probabilistic determination of the hyper parameters based on the obtained sensor data. FIGS. 3-4 illustrate such updating. This update accounts for the uncertainty in the initial prediction combined with both the probability of detection and false alarm from the sensor(s). Let $P_D(a)$ represent the probability of the sensor detecting a crack of size a when one exists, and let $P_{FA}(a)$ represent the probability of a false alarm, that is, the sensor indicating a crack of size a when one does not exist.

The new assessment is then used to adjust the hyper parameters. In one embodiment, the model input parameters are updated by using Bayes' theorem as follows. The inputs to the model can be represented by stochastic variables $X_i$ with density functions $f_{x_i}(x_i|\theta)$ that are defined by the hyper parameters $\theta = \theta_1, \theta_2, \theta_3 \ldots$ The shape parameters $\theta$ are themselves random variables with a joint distribution $g(\theta)$. Suppose there is an event NC, where no crack is detected by time $t_1$, then the hyper parameter probability distributions are updated by $$g(\theta | NC) = \frac{P(NC | \theta)g(\theta)}{\int P(NC | \theta)g(\theta)d\theta}, \text{ where}$$

$$P(NC | \theta) = (1 - P_D(a))\int_0^{t_1} f(t | \theta)dt + (1 - P_{FA}(a))\int_{t_1}^{\infty} f(t | \theta)dt.$$

Similarly, if DC represents the event that the sensor detected a crack by time $t_1$, then $$g(\theta | DC) = \frac{P(DC | \theta)g(\theta)}{\int P(DC | \theta)g(\theta)d\theta}, \text{ where}$$

$$P(DC | \theta) = P_D(a)\int_0^{t_1} f(t | \theta)dt + P_{FA}(a)\int_{t_1}^{\infty} f(t | \theta)dt.$$

The method may further include the steps of assigning a weight to each hyper parameter according to agreement between the sensor data and the output. Sensor measurement error is defined by its standard deviation $\sigma$. Each prediction associated with a set of hyper parameters $\theta_i$ is weighted according to their likelihood as determined by their agreement with k sensor observations $sm_j$ at time $t_j$ according to the following:

$$L(\theta_i) = \frac{\prod_{j=1}^{k} \int_{sm_j-\sigma}^{sm_j+\sigma} f_{t_j}(a | \theta_i)da}{\sum_{i=1}^{M} \prod_{j=1}^{k} \int_{sm_j-\sigma}^{sm_j+\sigma} f_{t_j}(a | \theta_i)da}$$

Thus, the probability density from each of the weighted projections may then be combined by normalizing their sum to determine the probability of failure as a function of time and/or usage.

$$f_T(t) = \sum_{i=1}^{M} f_T(t | \theta_i)w_i, w_i = L(\theta_i)$$

The final output probability density function may be used to generate an output prediction. This probability density can be integrated to determine the probability of failure as a function of time and/or usage. A confidence interval may be computed based on a preferred confidence level. The following equations may be used to compute the confidence interval, where $\bar{p}$ is the sample mean, K is the sample size, and z is computed to achieve the desired confidence level, which may be selected by a user.

$$P(T \leq t_1) = \int_0^{t_1} f(t)dt = \bar{p} = \frac{\sum_{j=1}^{K} I_{(0,t_1)}(t_j)}{K}$$

$$\left(\bar{p} - z\sqrt{\frac{\bar{p}(1-\bar{p})}{K}}, \bar{p} + z\sqrt{\frac{\bar{p}(1-\bar{p})}{K}}\right)$$

It is contemplated that projections using this methodology will converge in both expected time to failure and the uncertainty around this expectation.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method carried out by a digital computer for generating a probability distribution for a desired output variable, the output variable being a function of at least one input variable, wherein each input variable is defined by an input variable probability density function that is characterized by at least one hyper parameter, wherein each hyper parameter is defined by a hyper parameter density function, the method comprising the steps of:
   (a) uploading the hyper parameter density function(s) to the digital computer;
   (b) randomly sampling from each hyper parameter density function to create the input variables for the input variable probability density function(s);
   (c) randomly selecting a value from each input variable probability density function;
   (d) computing an output value using the selected input variable values;
   (e) repeating steps (c) and (d) to generate an output value probability density function, wherein steps (b)-(e) are performed b the digital computer;
   (f) obtaining output value sensor data from an output sensor and uploading the output value sensor data to the digital computer;
   (g) updating the hyper parameter density function using the output value sensor data and a probabilistic evaluation of the hyper parameter;

(h) assigning a weight to each hyper parameter according to agreement between the output value sensor data and the output variable; and (i) generating a final output value probability density function by averaging the weighted probability density functions, wherein steps (g)-(i) are performed by the digital computer.

2. The method of claim 1, further comprising the steps of generating an output prediction using the final output value probability density function.

3. The method of claim 2, further comprising the steps of computing a Confidence interval for the output prediction based on a preferred confidence level.

4. The method of claim 1, wherein step (g) includes updating the hyper parameter density function using Bayes' theorem.

5. The method of claim 1, wherein the desired output variable is crack length.

6. The method of claim 5, wherein step (f) includes obtaining output value sensor data related to the crack length.

7. The method of claim 1, wherein the at least one hyper parameter represents a characteristic parameter for a given set of data.

8. The method of claim 1, wherein the at least one hyper parameter represents the variability for a given set of data.

9. A method carried out by a digital computer for generating a probability distribution for predicting a crack length within an object as a function of usage of the object, the crack length being a function of at least one input variable, wherein each input variable is defined by an input variable probability density function that is characterized by at least one hyper parameter, wherein each hyper parameter is defined by a hyper parameter density function, the method comprising the steps of:

(a) uploading the hyper parameter density function(s) to the digital computer;

(b) randomly sampling from each hyper parameter density function to create the input variables for the input variable probability density function(s);

(c) randomly selecting a value from each input variable probability density function;

(d) computing a crack length value using the selected input variable values;

(e) repeating steps (e) and (d) to generate a crack length value probability density function, wherein steps (b)-(e) are performed by the digital computer;

(f) obtaining crack length sensor data from a crack length sensor and uploading the crack length sensor data to the digital computer;

(g) updating the hyper parameter density function using the crack length sensor data and a probabilistic evaluation of the hyper parameter;

(h) assigning a weight to each hyper parameter according to agreement between the crack length sensor data and the output variable; and (i) generating a final crack length value probability density function by averaging the weighted probability distributions, wherein steps (g)-(i) are performed by the digital computer.

10. The method of claim 9, further comprising the step of generating an output prediction using the final crack length value probability density function.

11. The method of claim 10, further comprising the step of computing a confidence interval for the output prediction based on a preferred confidence level.

12. The method of claim 9, wherein step (g) includes updating the hyper parameter density function using Bayes' theorem.

13. The method of claim 9, wherein the at least one hyper parameter represents the mean for a given set of data.

14. The method of claim 9, wherein the at least one hyper parameter represents the variance for a given set of data.

15. The method of claim 9, wherein step (f) includes obtaining crack length sensor data from a crack length sensor.

16. The method of claim 9, wherein steps (b)-(e) are performed by a digital computer.

17. The method of claim 16, wherein steps (g)-(i) are performed by a digital computer.

* * * * *